Patented Aug. 24, 1954

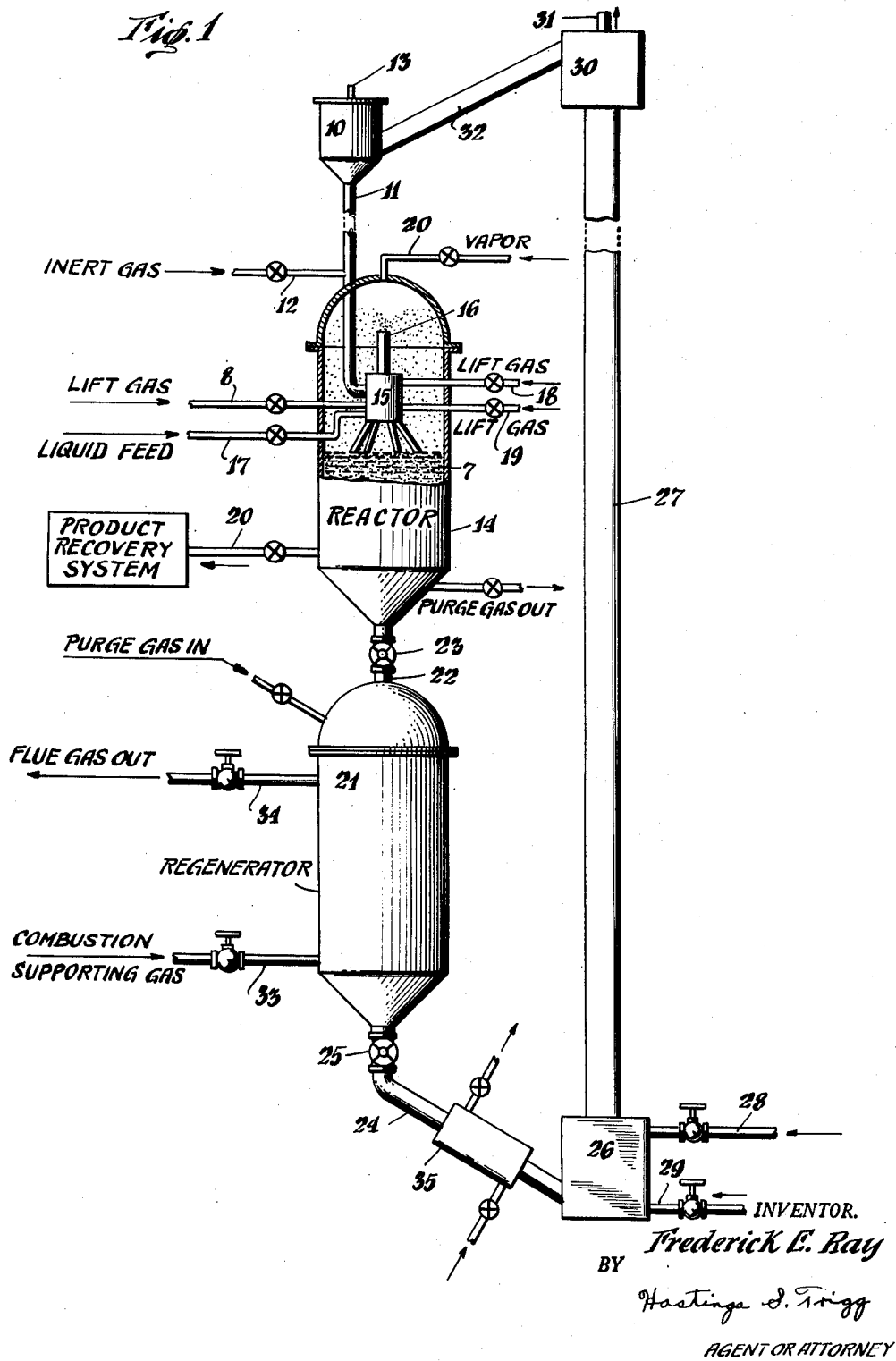

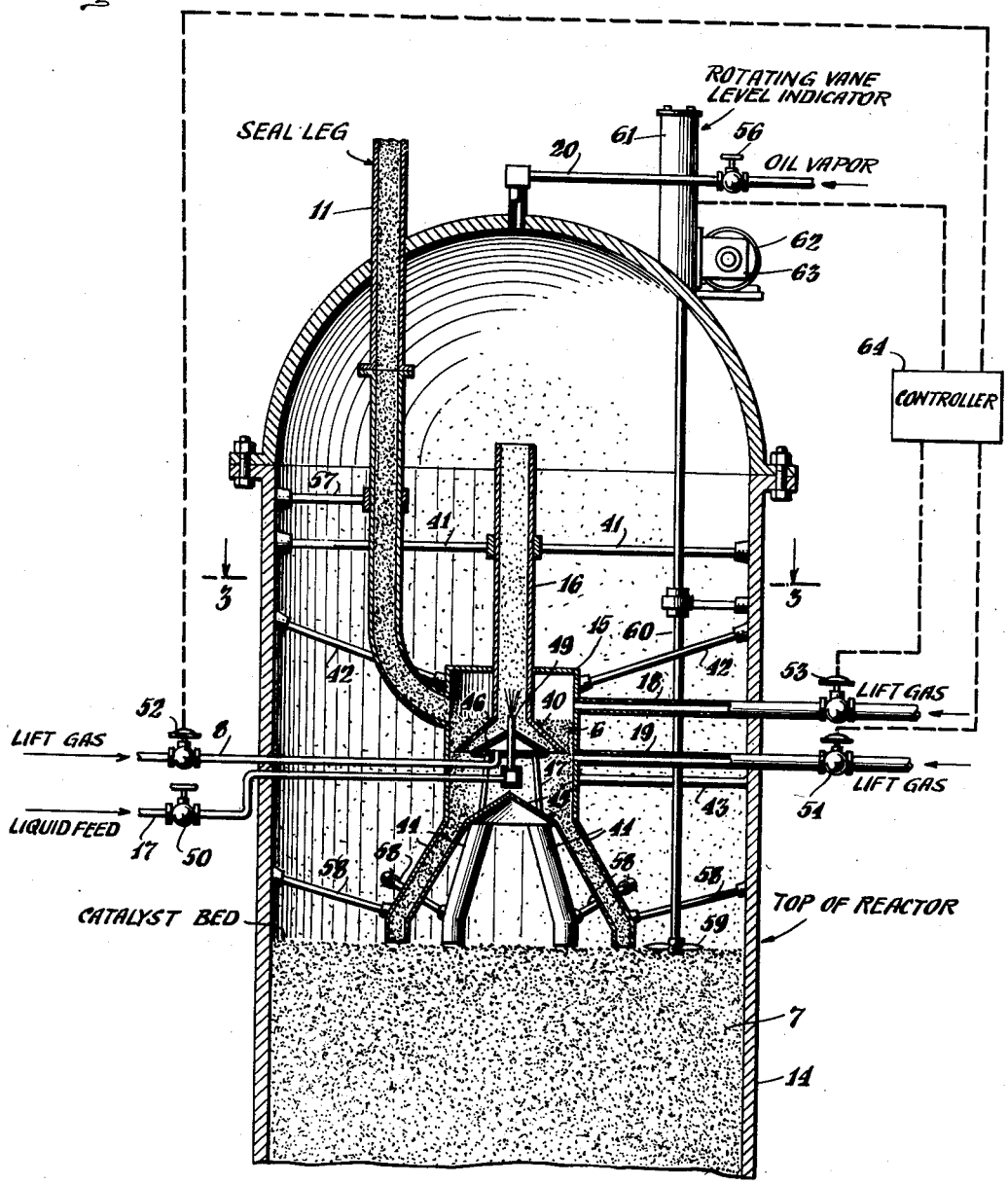

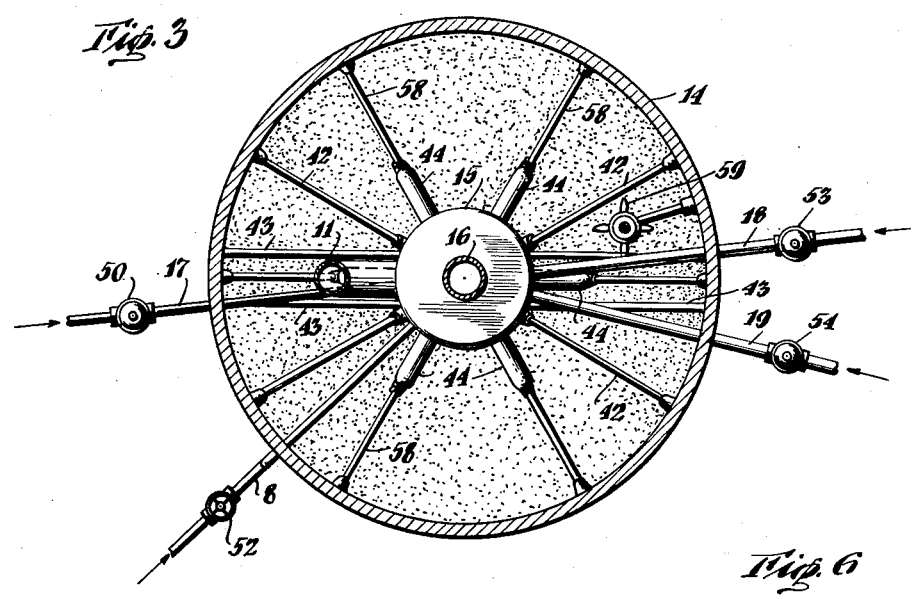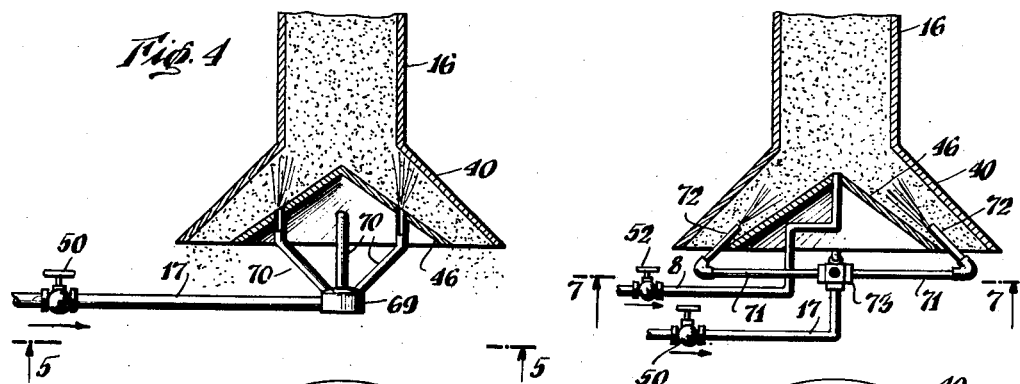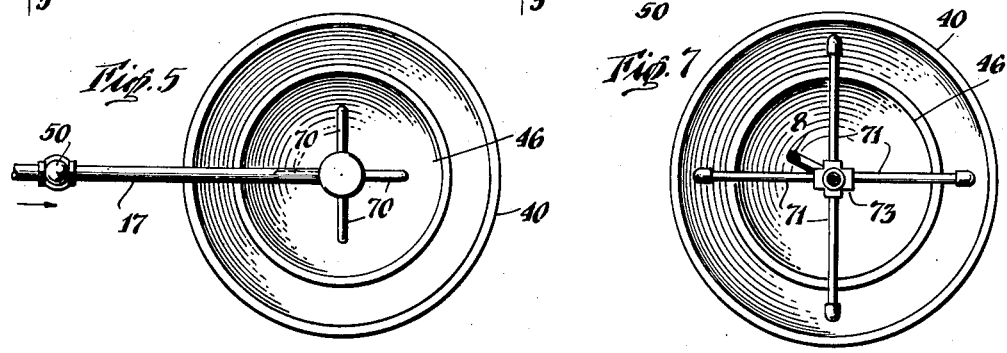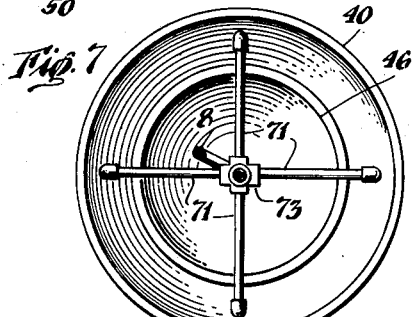

2,687,372

UNITED STATES PATENT OFFICE 2,687,372

METHOD AND APPARATUS FOR CONVERTING HEAVY HYDROCARBONS CHARGED IN LIQUID FORM

Frederick E. Ray, Woodbury, N. J., assignor to Socony-Vacuum Oil Company, Incorporated, a corporation of New York Application July 1, 1950, Serial No. 171,609

7 Claims. (Cl. 196—52)

This application is directed to the conversion of hydrocarbons in liquid form in the presence of a comminuted solid contact material. It is more particularly directed to the conversion of hydrocarbons to lighter hydrocarbons primarily in the gasoline boiling range, although processes other than cracking are contemplated, such as, for example, the destructive hydrogenation of liquid hydrocarbons in the presence of a suitable catalyst and hydrogen gas.

A variety of hydrocarbon conversion processes are practiced to change the structure of hydrocarbons to a more desirable and usable form. Such processes include dehydrogenation, dehydrocyclization, isomerization, polymerization, cranking, destructive hydrogenation and hydrogenation. Different processes are used for different starting materials to accomplish desired results. A variety of solid contact catalysts have been used for the various processes, some proving more effective in certain of the processes than in others. In addition, certain of the processes require the addition of an added reacting gas. For example, the destructive hydrogenation and hydrogenation processes require the presence of hydrogen gas under a suitable pressure, and a preferred catalyst, such as particles of alumina with oxide of molybdenum or chromium deposited thereon.

The contact mass material is usually an adsorptive material of the general nature of clay, such as fuller's earth, filter clays, refined and natural clays, acid-treated clays, various synthetic associations of alumina and silica, such as co-precipitated gels, gels of alumina and/or silica, and similar materials, any of which may have added materials, such as various metallic oxides, for various catalytic purposes connected with the conversion contemplated. For example, in reforming hydrocarbons, aromatizing or dehydrogenating catalysts such as tin, chromium or aluminum gels are used, or mixtures of alumina with chromium or molybdenum oxide. In some instances, such as, for example, the conversion of gas oil to ethylene, inert, particleform solids are used, such as refractory materials mullite, corhart, or even iron balls. The particles are suitably of a granular size, about 5–20 Tyler Screen Analysis, although larger or smaller particles may be used successfully.

The temperature in the reactor during conversion will vary considerably with the different processes effected. For example, catalytic cracking of heavy hydrocarbons to produce hydrocarbons in the gasoline boiling range may be performed at zero gauge pressure or pressures up to about 50 pounds gauge, and at temperatures in the range of about 800° F. to about 1200° F. Reforming in the presence of hydrogen may require pressures of about 200–300 p. s. i. g., and temperatures of about 800–1100° F.

The object of this invention is to provide a suitable method and apparatus for converting hydrocarbons in the presence of a suitable comminuted contact material when at least a portion of the hydrocarbon feed is in the liquid state. The invention contemplates bringing hot liquid hydrocarbons into contact with a suitable contact material to effect conversion of the hydrocarbon without the formation of troublesome deposits in the reaction zone and on the metal surfaces which usually accompany conversion of the heavy hydrocarbons.

In its broader aspects, the present invention contemplates maintaining a lower downwardly moving compact bed of contact material in the lower portion of an enclosed conversion zone, maintaining an upper enclosed compact bed of contact material in the upper region of the conversion zone, constantly supplying contact material to this upper bed to maintain the level thereof substantially constant, providing a lift passage which extends upwardly from below the surface of the upper compact bed of contact material and which opens into the upper region of the enclosed conversion zone, introducing lift gases into the upper bed of contact material to move a portion of it from below its surface into the lift passage, introducing liquid hydrocarbons in an upward direction into the lower portion of the lift passage to contact the contact material therein, lifting this contact material in gaseous suspension up the lift passage, and permitting it to enter the upper region of the conversion zone and to shower upon the surface of the lower downwardly moving compact bed of contact material.

The invention will now be described with reference to the attached figures, in which Figure 1 is a diagrammatic showing of a complete hydrocarbon conversion system, partially in section; and in which Figure 2 is a vertical view of the upper portion of the reactor of Figure 1, partially in section; and in which Figure 3 is a plan view of the top of the reactor taken on plane 3—3 of Figure 2; and in which Figure 4 is an enlarged section of the lift leg entrance of Figure 2 disclosing alternate liquid feeding means; and in which Figure 5 is a plan view of the lift leg entrance taken on plane 5—5 of Figure 4; and in which Figure 6 is a view similar to Figure 4 showing alternate feeding means; and in which Figure 7 is a plan view similar to Figure 5 taken on plane 7—7 of Figure 6.

The above indicated sketches are highly diagrammatic in form, intended to illustrate the invention.

Referring now to Figure 1, a complete system for the conversion of hydrocarbons is indicated, such as the catalytic conversion of heavy hydrocarbons to hydrocarbons largely in the gasoline boiling range. A suitable solid particle-form contact catalyst is stored in the hopper 10 and discharged from an exit in the bottom of the hopper into the elongated feed leg 11. The contact material descends as a substantially solid column forming a satisfactory vapor seal. In addition, an inert gas may be introduced into the feed leg through the conduit 12 to pass upwardly between the particles, escaping through the exit conduit 13.

Within the reaction vessel 14, the feed leg 11 terminates in a contact material distributor 15, located within the upper region of the vessel. The contact material distributor 15 is provided with a short lift tube or passage 16 extending through the top thereof, and a plurality of catalyst conduits 44 depending from the bottom periphery. The lift tube 16 and the conduits 44 will be described in greater detail hereinafter. A portion of the contact material in the lift pot is contacted with a spray of liquid hydrocarbons introduced through the conduit 17 and lifted through the lift tube 16 by suitable lift gases introduced into the lift pot through one or more of the conduits 8, 18, or 19. The liquid hydrocarbons are adsorbed on the contact material as it passes through the lift tube 16. The contact material discharged from the top of the lift tube 16 falls onto the top of a downwardly moving bed of contact material 7 in the lower section of the vessel. Additional hydrocarbons in vapor form may be introduced into the top of the vessel through the conduit 20. The remainder of the catalyst falls downwardly onto the bed of contact material 7 via conduits 44.

The hydrocarbons travel downwardly with the descending bed of contact material 7 in the reaction vessel 14 and are converted to other hydrocarbons, as desired, leaving a carbonaceous deposit on the surface of the contact material. The reaction products are removed from the vessel through the conduit 20' to the product recovery system, for separation and further treatment. The contact material is discharged from the bottom of the reaction vessel 14 into the top of the regeneration vessel 21, located therebelow, via the connecting conduit 22. The flow rate of contact material is controlled by the valve 23 in the conduit 22.

Within the regenerator 21, the contact material descends as a substantially solid column of contact material. In order to burn the carbonaceous deposits on the surface of the contact material, a combustion supporting gas, such as air, is introduced into the vessel through the conduit 33. The flue gas formed by the combustion is discharged through the conduit 34. The contact material, substantially free of deposits, is withdrawn from the bottom of the regenerator through the descending conduit 24, the flow rate being controlled by the valve 25 located therein.

The regenerated contact material is discharged from the conduit 24 into a lift pot 26, and lifted up the elongated lift leg 27 of a gas lift. Lift gas, such as air stream or flue gas is introduced through the conduits 28 and/or 29 into the lift pot 26, and discharged from the disengaging chamber 30, located atop the lift leg 27, through the stack 31. The contact material is separated from the lift gas in the chamber 30 and discharged through the conduit 32 into the storage hopper 10. The contact material is then in position to repeat the aforedescribed cycle.

In catalytic cracking reactions often the exothermic reactions in the regenerator give off an amount of heat usually in excess of that required by the endothermic reactions in the reactor. The prior art shows exchangers with various fin designs in the regenerator for cooling purposes and sometimes in both the reactor and regenerator with elaborate systems adapted to transfer the heat from regenerator to reactor as required. Recently, by increasing catalyst flow rates it has been possible to eliminate heat exchangers within the vessels, and these systems generally incorporate an exchanger in the system outside of these vessels. For example, in Figure 1, the unit 35 on conduit 24 may be a suitable balancing heat exchanger.

The former catalytic conversion systems show the use of other types of lifting devices to raise the catalyst from the bottom of one vessel to the top of the other. For example, bucket-type elevators or elevators of the Redler type have been used successfully in these systems. Some systems are arranged with the reactor and regenerator in side by side relationship or with the regenerator over the reactor. Any of these modifications are applicable to the apparatus of the present invention.

Referring now to Figure 2, the top section of the reaction vessel is shown in greater detail. The substantially compact column of particles in the feed leg or seal leg 11 flows into the contact material distributor 15 through the side wall in the upper section thereof, forming a substantially compact mass of contact material within the contact material distributor 15. The surface 6 of this mass of contact material within the distributor 15 is approximately at the point wherein the contact material is discharged from feed leg 11. The vertically disposed lift passage 16 terminates at its lower end at a point substantially below the surface 6 of the mass of contact material in the distributor 15. An inverted, funnel-shaped member 40 is attached to the bottom of the lift passage 16 to aid in directing a portion of the contact material into the lift passage. The lift passage or tube 16 is supported in position by the rods 41 attached to the inner wall of the reaction vessel 14. The contact material distributor 15 is similarly suspended by rods 42. Additional cross braces, suitably angle irons, 43, 43 act to support the distributor 15 and its related members in its substantially central location near the top of the reactor 14. The contact material distributor 15 is of substantially circular cross section and has a multiplicity of depending conduits or pipes 44 connecting with its bottom periphery. These conduits 44 aid in the maintenance of the level of the downwardly moving bed of contact material 7 at or near the outlet of the conduits. A deflector 45 of conical shape is located in the center and bottom of the contact material distributor 15, adapted to aid in causing the proper flow of the contact material through the distributor. If desired, a feeding manifold box 46 of substantially conical shape can be located horizontally in the entrance to the lift leg 16. The manifold is supported suitably by rods 47 attached to the conical deflector 45 located therebelow. The feeding manifold 46 can be a completely enclosed cone as shown in Figure 2. In such an embodiment, the manifold box 46 may be provided on its sloping roof with a plurality of openings or slots 6. Lift gas is introduced through conduit 8 into the enclosed cone and dispersed through the openings 6 into the lift passage 16. The feeding baffle 46 need not be completely enclosed, however. It can be a conical-shaped member open at the bottom, and having a substantially smooth surface, or a perforated surface, as in a screen or the like, as shown in Figures 4 and 6. In such an embodiment, lift gas is introduced through conduit 8 in an upward direction at a point below the perforated baffle. Alternatively, the lift gas can be introduced in an upward direction through a conduit extending through the baffle 46 near the apex thereof. When the liquid feed is also introduced near the apex of the baffle, the conduit 8 through which the lift gas is introduced can be in juxtaposition to the liquid feed nozzle 49, or it can be fed through the annulus of a tube concentric to the nozzle 49. It must be strictly understood, however, that the baffle 46 is not an indispensable feature. Suitable lifting can be effected by merely introducing a lift gas at a point immediately below the mouth of the funnel-shaped member 40 on the lift passage 16.

Hydrocarbons, either at normal atmospheric temperatures or partially preheated but usually below a conversion temperature are introduced through the conduit 17 and the nozzle 49 in an upward direction into the opening of the lift passage 16. The nozzle 49 may extend through the cone-shaped manifold 46 near its apex, if a manifold is used. Alternative embodiments of the location of liquid feed nozzle 49 are described hereinafter. A suitable lift gas, a hydrocarbon vapor, steam, etc., is introduced through conduit 19 at substantially the level of the lower edge of the funnel-shaped member 40. Alternatively or concurrently, a lift gas can be introduced through conduit 18 at a level substantially above the surface 6 of the mass of contact material in the distributor 15. The net effect of the introduction of lift gas through conduits 18 and/or 19 is to move contact material inwardly towards the mouth of the funnel-shaped member 40, whereby it contacts the liquid feed coming from the nozzle 49, and it is picked up by the lift gas introduced through conduit 8, which is preferably the main, or primary, lift gas feed, and carried upwardly through the lift passage 16. The flow of vapors through the lines 8, 18, and 19 is controlled by valves 52, 53, and 54, respectively, located therein.

In preferable operations the contact material supplied via leg 11 is at a conversion supporting temperature, that is at a temperature suitable for supplying any sensible heat which may be required to preheat the reactant feed to a conversion temperature and in addition the endothermic heat required for the conversion. Hence a substantial portion of the liquid feed becomes vaporized substantially immediately upon contact with the hot contact material and the resulting vapor may in some operations be sufficient to effect catalyst lifting through the leg 16 without supply of gas through pipe 8. The unvaporized portion of the liquid feed becomes adsorbed on the catalyst and is carried upwardly through lift leg 16 with the catalyst. The leg 16 should be of sufficient length to insure substantially complete adsorption of any non-vaporized liquid feed upon the catalyst. In that modified form of the operation wherein the reaction heat is supplied by means other than the catalyst, the entire liquid feed will become adsorbed on the catalyst in the lift leg 16.

The lift passage 16 is made just long enough to permit substantially complete adsorption of the liquid hydrocarbons by the contact material therewithin. The vapors and contact material pass out the open top of the passage and fall as a shower onto the top of the downwardly moving bed 7 located therebelow. Additional hydrocarbon vapor feed can be introduced through the conduit 20 into the top of the vessel to pass downwardly with the contact material. The flow of vapor in this line is controlled by the valve 56. The rods 57 and 58 are bracing rods which aid in positioning the seal leg 11 and the drain conduits 44.

The bed level is constantly measured by one of several level indicators known to the art. Shown in Figure 2 is the rotating-vane indicator, the propeller 59 attached to the end of the rotated shaft 60 always seeking the surface of the contact material. In the housing 61 is located mechanism to raise or lower the shaft 60 according to the level of the bed, and the motor 62 and gear box 63, attached to the housing 61, serve to provide motive power for keeping the shaft 60 in rotation.

In normal operation of the aforedescribed apparatus, contact material is introduced through leg 11 to the catalyst distributor 15, wherein a substantially compact bed of contact material is maintained which extends downwards from the level of the point of emission of contact material from feed leg 11. A major proportion of the contact material is moved towards the opening of the funnel-shaped member 40 on the lift passage 16, by means of the secondary lift gas introduced via conduits 18 and/or 19. In the opening of the funnel-shaped member 40, the contact material is contacted with a substantially liquid hydrocarbon feed introduced via nozzle 49, or a suitable embodiment thereof. The contact material is then moved upwardly in gaseous suspension through the lift passage 16 by means of the force exerted by the primary lift gas introduced through conduit 8, and by the secondary lift gas introduced via pipes 18 or 19. The contact material overflows from the upper end of lift passage 16 and showers substantially uniformly downwardly onto the bed of contact material 7 so as to maintain the surface level of the bed substantially flat. Usually, about 85 per cent of the contact material feed to the reactor is supplied via the lift pipe 16. The remaining 15 per cent of contact material flows downwardly through pipes 44 onto the surface of the bed 7. The rate of contact material flow from the lower ends of each of the pipes 44 is controlled by the rate of contact material downward flow in that portion of the bed therebelow which lies within the area on the bed surface to which contact material flows from the pipe. This contact material flow is controlled by the valve 23 shown at the bottom of the reactor in Figure 1. The pipes 44 are of such size that if the contact material bed level should pull away from the lower ends thereof, substantially more contact material will then flow through the pipes 44 under free flow conditions. Hence, if due to a sudden increase in the rate of withdrawal of contact material from the bottom of the reactor or due to a sudden decrease in the rate of contact material being supplied via lift passage 16, the bed 7 surface should tend to fall below the lower ends of pipes 44 this tendency will be counteracted by an increase of contact material flow through the pipes 44 under free flow conditions. In this manner the pipes 44 act as a control to maintain the level of bed 7 always substantially up to the lower ends of the pipes 44. If the rate of catalyst flow up through passage 16 should suddenly rise above 85 per cent of the total contact material feed, but below 100 per cent of the rate of contact material withdrawal from the reactor, then the pipes 44 will automatically compensate so as to maintain the contact material level constant at the level of the lower ends of pipes 44. If due to a sudden increase in the rate of contact material supply via the lift passage 16 or due to a sudden decrease in the rate of contact material withdrawal from the bottom of the reactor, the total rate of contact material feed to the reactor via lift leg 16 and pipes 44 should exceed that which is being withdrawn from the bottom of the reactor through pipe 22 shown in Figure 1, then the surface level of bed 7 will tend to build up above the level of the lower ends of pipes 44. Under these conditions the increase in bed level will be measured by rotating vane level indicator which will automatically actuate controller 64 to partially close the automatic valve 54 on pipe 19, and/or automatic valve 53 on conduit 18, whereby the rate of lift gas supplied to move contact material up the lift leg 16 will be decreased. It is usually desirable to maintain the total rate of gas flow in the lift passage 16 at a constant optimum. Accordingly, when the flow rate of secondary gas, supplied either via pipe 18 or pipe 19, is decreased to decrease contact material flow to the lift passage, or is increased to increase the percentage contact material flow to and through the lift passage, it is usually preferable to make a compensating, opposite adjustment on the rate of primary lift gas feed from pipe 8. The valve 52 on pipe 8 can be operated also through controller 64 in such a manner that when valve 53 and/or 54 is throttled, the valve 52 is opened to a compensating extent. This operation will result in a decrease in the rate of contact material being supplied to the reactor bed 7 via lift passage 16 so that the level of the bed will seek its usual position corresponding to the level of the lower ends of pipes 44. It will be understood that the controller 64 may actuate any of the vapor inlet pipes shown on the drawing depending on the one or ones which are being employed. It is contemplated that some fluctuations in the bed surface level above the ends of pipes 44 may be tolerated, but the level is maintained, in all cases, within about one foot of the lower ends of pipes 44.

In operations wherein hydrocarbon reactants are converted in the presence of contact materials it is important to maintain the length of bed through which the reactants pass substantially constant in order to provide proper control of reactant residence time in contact with the solid material. It will be noted that by this invention there is provided a method for effecting extremely uniform and intimate admixture of the liquid charge with a major portion of the catalyst charged to the reactor prior to the time that the catalyst reaches the compact bed in the reaction zone. In addition, there is provided a method for controlling the surface level of the bed substantially constant by means of the combination of the gravity flow pipes 44 and automatic control of the rate of lift gas supply to the lift passage 16.

In the preferred form of this invention from 75-90 per cent of the catalyst charged to the reactor is introduced via the lift passage 16 and the remainder via the gravity flow pipes 44. It is contemplated, in the broader forms of this invention, that up to 45 per cent of the total catalyst charged to the vessel will be handled by pipes 44 and down to only about 55 per cent may be supplied via lift passage 16.

In order to prevent the liquid hydrocarbons and contact material from striking the roof of the reaction vessel, vapors may be introduced downwardly through the top of the vessel above the outlet of the lift passage to drive the contact material and liquid hydrocarbons downwardly toward the bed located therebelow. By this expedient the lay down of deposits on the roof of the reaction vessel is avoided, as is attrition of the contact material at that location.

Referring to Figure 3, the cross members 43 are shown more clearly supporting the contact material distributor 15 and lift passage 16 in a centrally located position in the reactor 14. The conduits 44 are shown feeding contact material radially to equally spaced locations throughout the cross-section of the bed.

Referring now to Figures 4 and 5, alternate means for introducing liquid feed into the lift passage 16 is shown. The liquid hydrocarbons, properly prepared for treatment, are introduced through the conduit 17 into a distributor 69. The distributor is connected with the feeding baffle 46 by a multiplicity of conduits 70 equally distributed around the conical baffle to direct the liquids in a spray generally upward into the stream of contact material passing between the baffle and the funnel-shaped member 40. Each of the conduits 70 has a suitable restriction in the outlet adapted to spray the liquid discharged therefrom into the contact material stream.

Another embodiment of the invention is shown in Figures 6 and 7. This is similar to the previous embodiment. The liquid feed is introduced into the distributor 73 through the conduit 17. The feed is conducted from the distributor 73 through conduits 71, radially directed, to the discharge nozzles 72. The nozzles are directed in the general direction of the stream of contact material in the region between the baffle 46 and funnel-shaped member 40. Also shown is another method for introducing the main lift gas. In this embodiment, the lift gas is introduced via conduit 8 through the apex of the conical-shaped baffle 46, thereby lifting the contact material, with the liquid feed partially adsorbed thereon, up the lift passage 16.

Although the present invention has been described in conjunction with preferred embodiments, it is to be understood that modifications and variations may be resorted to without departing from the spirit and scope of this invention, as those skilled in the art will understand. Such variations and modifications are considered to be within the purview and scope of the appended claims.

What is claimed is:

1. The method for converting hydrocarbons in the presence of suitable comminuted contact material wherein at least a portion of the hydrocarbons are in the liquid state, which comprises maintaining a lower downwardly moving compact bed of contact material in the lower portion of an enclosed conversion zone; maintaining an upper confined compact bed of contact material in the upper region of said conversion zone; constantly supplying contact material as a substantially compact stream to said upper confined compact bed of contact material to maintain the level thereof substantially constant; maintaining a lift passage extending upwardly from below the surface of said upper confined bed of contact material and opening into the upper region of said conversion zone; introducing gases laterally into said upper confined bed of contact material to move said contact material towards the lower portion of the lift passage; introducing a stream of gases upwardly into the lower portion of said lift passage from a point within the upper confined bed substantially below the opening of the lift passage to lift a major proportion of the contact material in the upper confined bed upwardly through the lift passage, in gaseous suspension; introducing liquid hydrocarbons in an upward direction into the lower portion of said lift passage to become adsorbed on the contact material therein; permitting this contact material to enter the upper region of the conversion zone; deflecting it downwardly with a downward stream of gases to shower upon the surface of the downwardly moving compact bed of contact material in the conversion zone; passing the remaining preportion of the contact material in the upper confined bed of contact material directly downward as a plurality of compact streams to a plurality of locations substantially equally distributed over the surface of the lower downwardly moving bed of contact material at a substantially uniform level to prevent the surface of the lower bed from falling substantially below that level; and controlling the flow of said laterally and upwardly flowing streams of gases introduced into said upper confined bed of contact material to prevent the surface of said lower bed of contact material from rising substantially above said level.

2. An apparatus for the conversion of hydrocarbons in the presence of a descending compacted column of comminuted contact material wherein at least a portion of the hydrocarbons are introduced in liquid form, which comprises a closed reaction vessel, a closed contact material distributor located in the upper region of said reaction vessel; a descending contact material feed leg opening into said contact material distributor; a vertical lift passage which communicates from within said contact material distributor, at a level below the opening of said descending feed leg, upwardly through said enclosed contact material distributor with the upper region of said enclosed reaction vessel; means for introducing gases into said contact material distributor to lift contact material upwardly through said vertical lift passage; and means for introducing liquid hydrocarbons upwardly into the lower portion of said vertical lift passage to become adsorbed on the contact material passing therethrough.

3. An apparatus for the conversion of hydrocarbons in the presence of a descending compacted column of comminuted contact material wherein at least a portion of the hydrocarbons are introduced in liquid form, which comprises an enclosed reaction vessel; an enclosed contact material distributor located in the upper region of said reaction vessel; a descending contact material feed leg opening into said contact material distributor; a vertical lift passage which communicates from within said contact material distributor, at a level below the opening of said descending feed leg, upwardly through said enclosed contact material distributor with the upper region of said enclosed reaction vessel, and having an inverted funnel-shaped member affixed to the lower extremity thereof; an enclosed conical-shaped feeding baffle having a plurality of openings on the sloping roof thereof and located near the opening of said inverted funnel-shaped member on a common vertical axis therewith; means for introducing gases laterally into said contact material distributor; means for introducing additional gases into said feeding baffle to escape upwardly through the openings therein to lift contact material upwardly through said vertical lift passage; and means for introducing liquid hydrocarbons upwardly through the apex of said feeding baffle into the lower portion of said vertical lift passage to become adsorbed on the contact material passing therethrough.

4. An apparatus for the conversion of hydrocarbons in the presence of a descending compacted column of comminuted contact material wherein at least a portion of the hydrocarbons are introduced in liquid form, which comprises an enclosed reaction vessel; an enclosed contact material distributor located in the upper region of said reaction vessel; a descending contact material feed leg opening into said contact material distributor; a vertical lift passage which communicates from within said contact material distributor, at a level below the opening of said descending feed leg, upwardly through said enclosed contact material distributor with the upper region of said enclosed reaction vessel; means for introducing gases into said contact material distributor to lift contact material upwardly through said vertical lift passage; means for introducing liquid hydrocarbons upwardly into the lower portion of said vertical lift passage to become adsorbed on the contact material passing therethrough; conduit means adapted to feed contact material from the bottom of said contact material distributor to fall on a descending column of contact material within said reaction vessel to prevent the level of said column from falling substantially below the discharge point of said conduit means; and means for controlling the means for introducing gases into said contact material distributor to prevent the level of said column from rising substantially above said discharge point of said conduit means.

5. An apparatus for converting hydrocarbons in the presence of a descending compacted column of comminuted contact material wherein at least a portion of the hydrocarbons are introduced in liquid form, which comprises a reaction vessel; a contact material distributor located in the upper region of said vessel; a descending contact material feed leg opening into said distributor; a vertical lift passage which communicates from within said contact material distributor, at a level below the opening of said feed leg, upwardly through said distributor with the upper region of said reaction vessel; means for introducing gases into said distributor to lift contact material upwardly through said lift passage; means for introducing hydrocarbons in liquid form into the lower end of said lift passage in a generally upward direction to be adsorbed by the contact material passing therethrough; means for introducing hydrocarbon vapors into the top of said reaction vessel above the outlet of said lift passage in a downward direction to substantially prevent the contact material with liquid hydrocarbons adsorbed thereon from striking the roof of said reaction vessel; a multiplicity of depending conduits attached to the bottom of said contact material distributor adapted to feed contact material from the distributor to a multiplicity of locations substantially equally distributed throughout the cross-section of the vessel at a substantially uniform level onto a descending compact column of contact material within said reaction vessel to prevent the height of said column from falling below that level; means for measuring the height of the column of contact material in the vessel; and means associated therewith for controlling the flow of gases into the lift pot in response to a change in the height of the column to prevent the height from rising above that level.

6. The method for converting fluid hydrocarbons in the presence of suitable comminuted contact material, which comprises: maintaining a lower downwardly moving compact bed of contact material in the lower portion of an enclosed conversion zone, maintaining an upper confined compact bed of contact material in the upper region of said conversion zone, constantly supplying contact material to said upper bed as a confined compact stream, maintaining a lift passage extending upwardly from below the surface of said upper bed of contact material to a level thereabove within the upper section of said conversion zone, suspending contact material from said upper bed in a suitable lift gas and passing said suspension upwardly through said lift passage, supplying fluid hydrocarbon charge to said lift passage, discharging contact material and fluid hydrocarbons from the upper end of said lift passage and passing said contact material and fluid hydrocarbons downwardly onto said lower confined compact bed of contact material, also passing contact material as at least one confined compact column from said upper bed of contact material onto the surface of said lower downwardly moving bed of contact material to prevent the level of said bed falling substantially below the lower level of a confined column, controlling the flow of lift gas of contact material to prevent the level of the lower bed of contact material from rising substantially above the level of the lower end of said confined column.

7. The method for converting hydrocarbons in the presence of a suitable comminuted contact material wherein at least a portion of the hydrocarbons are in the liquid state, which comprises: maintaining a lower downwardly moving compact bed of contact material in the lower portion of an enclosed conversion zone, maintaining an upper confined compact bed of fresh hot contact material in the upper region of said conversion zone, constantly supplying hot contact material at a temperature suitable for the desired conversion to said upper confined bed of contact material to maintain the level thereof substantially constant, maintaining a lift passage extending upwardly from below the surface of said upper confined bed of contact material and opening into the upper region of said conversion zone, passing a lift gas into said upper confined bed of contact material to move the major portion of the contact material from below the surface of said upper confined bed into said lift passage, introducing liquid hydrocarbons into the lower portion of said lift passage to contact the contact material therein and lifting this contact material in gaseous suspension up the lift passage, discharging said contact material from said lift passage into the upper region of said conversion zone and then showering said contact material downwardly onto the surface of said lower downwardly moving compact bed of contact material, passing contact material uncontacted by liquid charge from the upper confined bed directly downwardly onto the surface of said lower downwardly moving bed of contact material, and supplying a vaporized hydrocarbon charge to said lower bed of contact material without first passing said vaporized charge through said lift passage.

References Cited in the file of this patent

UNITED STATES PATENTS

| Number | Name | Date |
|---|---|---|
| 2,458,162 | Hagerbaumer | Jan. 4, 1949 |
| 2,459,824 | Leffer | Jan. 25, 1949 |
| 2,556,514 | Bergstrom | June 12, 1951 |